United States Patent [19]

Mamolou

[11] Patent Number: 4,796,779
[45] Date of Patent: Jan. 10, 1989

[54] COMBINED FILTER HOUSING AND EXTRACTOR

[76] Inventor: Charles A. Mamolou, 5 Princeton Dr., Bordentown, N.J. 08505

[21] Appl. No.: 142,010

[22] Filed: Jan. 11, 1988

[51] Int. Cl.$^4$ .............................................. B65H 3/00
[52] U.S. Cl. ...................................... 221/36; 221/37; 221/40; 221/45; 221/220; 294/99.2
[58] Field of Search .................. 221/36, 37, 40, 45, 221/210, 213, 220, 259; 294/1.1, 99.2, 131, 8.5, 11; 220/85 D, 85 E; 292/80, 87

[56] References Cited

U.S. PATENT DOCUMENTS

| | | | |
|---|---|---|---|
| 2,565,636 | 8/1951 | Tinnerman | 292/80 X |
| 3,094,323 | 6/1963 | Catania | 221/210 X |
| 4,093,297 | 6/1978 | Reiber | 221/259 X |
| 4,121,726 | 10/1978 | Pemberton | 221/37 |
| 4,214,673 | 7/1980 | Heath et al. | 221/259 |
| 4,478,005 | 10/1984 | Mundschenk | 292/87 X |
| 4,629,092 | 12/1986 | English | 221/259 X |
| 4,676,396 | 6/1987 | Mamolou | 221/259 X |
| 4,739,902 | 4/1988 | Joslyn et al. | 221/40 X |

*Primary Examiner*—Joesph J. Rolla
*Assistant Examiner*—Gregory L. Huson
*Attorney, Agent, or Firm*—Sachs & Sachs

[57] ABSTRACT

A combined filter housing for storing a plurality of flattened conically-shaped filters therein and a combination cover and extractor for the stored filters includes an extractor mechanism disposed within the cover having semi-adhesive resilient members disposed on a pair of distal ends which comes into contact with the stored filters. By applying pressure proximate the apex of the arms, the filter is engaged by the semi-adhesive resilient member and by removing the combination cover and extractor a single filter may be removed and is ready to be used without further handling.

7 Claims, 2 Drawing Sheets

COMBINED FILTER HOUSING AND EXTRACTOR

BACKGROUND OF THE INVENTION

1. Field of the Invention

The present invention relates to filter housings and, more particularly, to a combined filter housing and combination cover and extractor mechanism capable of removing individual filters.

2. Discussion of the Relevant Art

The Applicant is aware of several devices which are designed to store and dispense paper filters and in particular, coffee filters, such as those disclosed in U.S. Pat. No. 4,093,297 issue to Reiber, on June 6, 1978; U.S. Pat. No. 4,214,673 issued to Heath, et al., on July 29, 1980; as well as Applicant's own U.S. Pat. No. 4,676,396 issued on June 30, 1987, and applicants currently pending application Ser. No. 117,085, filed Nov. 5, 1987. However, none of these devices whether taken alone or in combination, reveal a simple filter housing and dispensing mechanism which is able to store flattened conic filters in a substantially dust free or enclosed environment, dispenses them hygienically and prepares them for insertion into the filter housing or receiving device ready for use without touching the filter by the user thereof.

The apparatus as set forth herein overcomes these shortcomings by providing combined filter housing and extractor suitable for storing a plurality of flattened conically-shaped filters in an essentially enclosed housing. The filters to be dispensed are inserted from their shipping container into one end (enlarged opening) in the housing ready for use. The enclosed end opening is provided with a lid to provide protection for the filters stored within the housing. An opening is provided in the top surface of the housing. A combined cover and extracting mechanism capable of readily removing a single filter, repeatedly, as required by the user thereof, is also provided. All these features are achieved with a minimum of complexity and with economy of production.

Therefore it is an object of the present invention to provide a filter housing which is capable of storing a plurality of filters and is essentially completely enclosed to prevent dust and debris from accumulating on the filters.

It is a further object of the present invention to provide a relatively inexpensive, attractive, combination filter housing and extractor mechanism that is capable of repeatedly dispensing a single filter as required suitable for mounting in either a horizontal or vertical position.

It is still yet another object of the present invention to provide a filter housing and extractor mechanism which stores and dispenses flattened conically-shaped filters and dispenses and opens the filter for insertion into a filter receiving device, used on coffee makers, without the user thereof coming into contact with the filter.

It is still yet another object of the present invention to provide a combination filter housing and extractor mechanism for flattened filters which is attractive and may also be utilized for the placement of advertising indicia thereon.

It is still yet another object of the present invention to provide a relatively inexpensive filter housing and filter extractor mechanism which is inexpensive to manufacture and convenient to use.

SUMMARY OF THE INVENTION

A combined filter housing and extractor, according to the principles of the present invention, includes a filter storage device capable of holding a plurality of conically-shaped filters collapsed into a generally pie-shaped configuration therein, the storage device includes a hollow generally pie-shaped housing having a top surface provided with a generally pie-shaped opening, a bottom surface, side walls, a small end wall and a larger open end through which the plurality of filters may be introduced. A generally pie-shaped covering device covers the top surface opening and includes a cover retaining mechanism which is disposed proximate the larger end thereof for cooperating with the housing opening releasably retaining the cover device in the housing opening. The cover is also provided with a major opening and a minor opening. A guide device is disposed about the minor opening. An extractor device includes a V-shaped member having a pair of arms adapted to cooperate with each other by flexing under pressure. One arm of the pair of arms of the extractor is slidably received into the cover minor opening for movement perpendicular to the cover as determined by the guide member. The other arm of the pair of arms is inserted into the cover major opening, the major opening permitting the other arm to flex or return within the cover major opening. Resilient semi-adhesive material is disposed at the distal end of each of the arms. Removing the extractor simultaneously with the cover, while applying pressure to the extractor, permits a single filter to be removed from the storage housing in an unfolded condition ready for insertion into the filter receiving device.

The foregoing and other objects and advantages will appear from the description to follow. In the description reference is made to the accompanying drawings which form a part hereof, and in which is shown by way of illustration a specific embodiment by which the invention may be practiced. This embodiment will be described in sufficient detail to enable those skilled in the art to practice the invention and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DESCRIPTION OF THE PREFERRED EMBODIMENT

Figure 1:
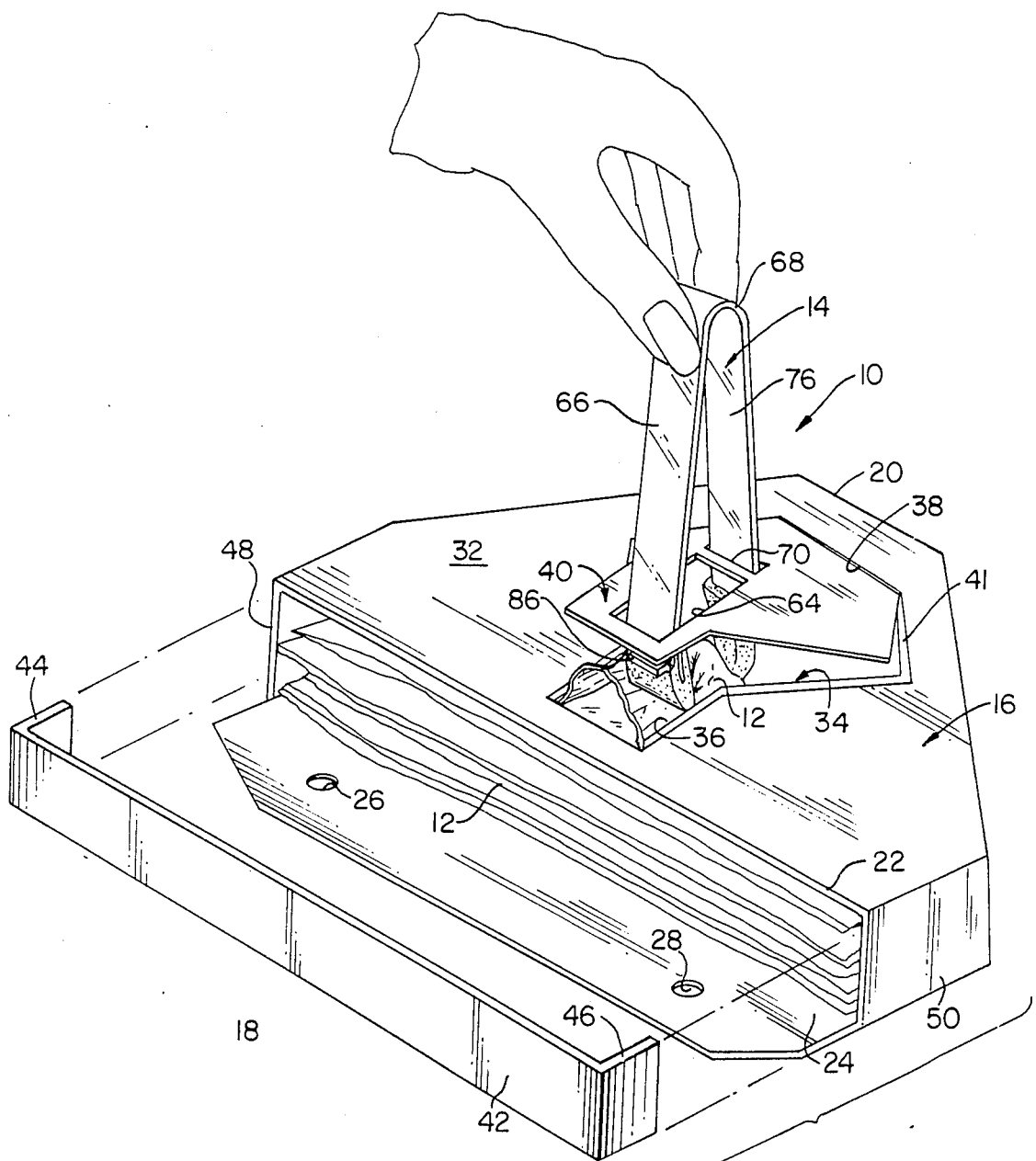
FIG. 1 is a partially exploded view of a combined filter housing and an extractor, according to the principles of the present invention mounted on a horizontal surface with a filter partially removed.
Figure 3:
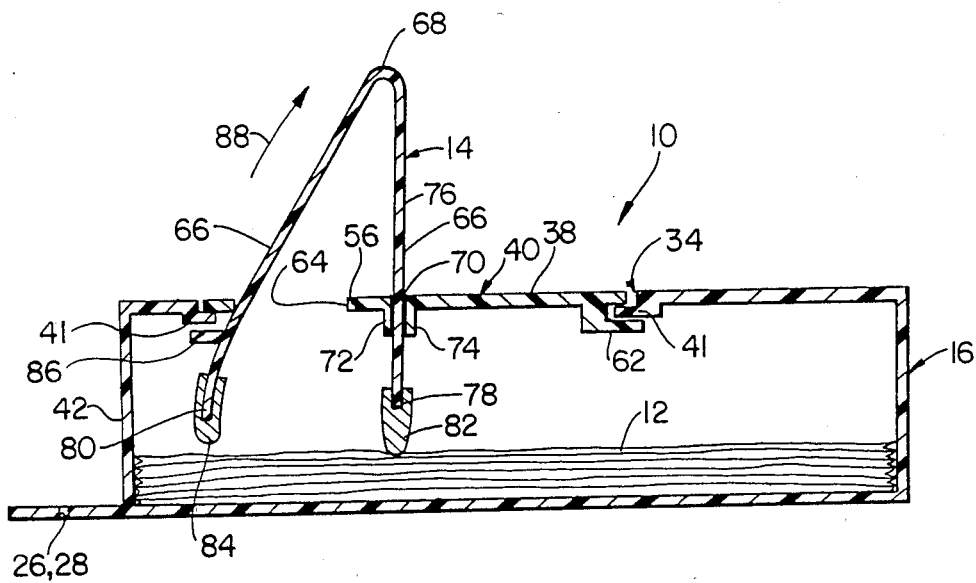
FIG. 3 is a cross-sectional view in elevation of the device disclosed in FIG. 1 in its closed position.

Referring now to the figures, and more particularly to FIGS. 1 and 3, the filter housing and extractor assembly 10, is shown in position wherein a single filter 12 is in the process of being removed by an extractor member 14 from a housing 16 which is disposed upon a horizontal flat surface 18.

Figure 2:
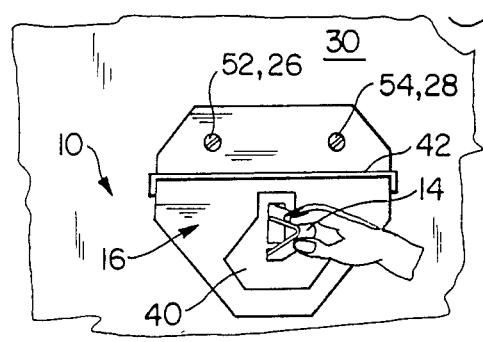
FIG. 2 is a reduced view of the combined filter housing and extractor affixed to a vertical surface.

The housing 16 is hexagonally formed having a smaller end 20 and a larger end 22 with a generally pie-shaped configuration. The housing 16 is also provided with a bottom surface 24 which extends beyond the larger end 22 and has a pair of apertures 26 and 28 which may be used for affixing the housing 16 to a horizontally disposed flat surface 18 or a vertically disposed flat surface 30, as shown in FIG. 2. The housing 16 is also provided with a top surface 32 into which an octagonal opening 34 is provided. The octagonal configuration for the opening 34 may also be considered generally pie-shaped having a narrow portion 36 and a broader portion 38. An inwardly extending lip portion 41 extends completely around the periphery of the octagonal opening 34 which is provided in order to support the cover member. The larger end 22 of housing 16 is preferably left open and is adapted to receive a plurality of conically-shaped filters 12, which are generally provided in boxes of 50, 100 or 200 and in their packaged condition are collapsed to form a pie-shaped configuration, as is well known. The apex of the filter would be inserted first into the opening with the arcuate edges being disposed proximate the open end 22 of the housing 16. Once the filters 12 have been placed within the housing 16 a lid member 42 remains in position by frictional forces between the ends 44 and 46 and the walls 48 and 50 of the housing 16.

Referring now to FIG. 2 there is shown a filter housing and extractor assembly mounted to a vertical wall by two screws 52 and 54 placed through apertures 26 and 28 respectively.

Figure 4:
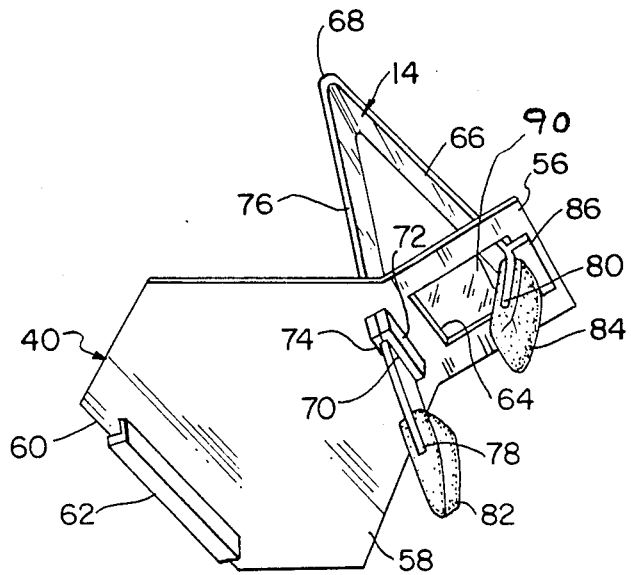
FIG. 4 is a perspective bottom view of the cover and extractor mechanism particularly pointing out the cover locking and guide mechanisms.

Referring now to FIG. 4 which is a prospective bottom view of the extractor member 14 disposed within the cover member 40. The cover member 40 includes a generally narrow or elongated portion 56 and a larger hexagonally portion 58, which are adapted to cooperate with the narrow portion 36 and broader portion 38, respectively provided in the octagonal opening 34 in the top surface 32 of the housing 16. Proximate the edge 60 of the broader portion 58 of cover member 40 an L-shaped retaining member 62 is provided. Retaining member 62 is permanently affixed to the cover member 40 and its function will be described hereinafter. The smaller elongated portion 56 of cover 40 is provided with a rectangularly-shaped opening 64 which is adapted to receive therein one arm 66 of extractor member 14. Arm 66 is permitted to freely move within the rectangular opening 64 and does so when pressure is exerted to the arm 66 proximate the apex 68 of extractor member 14. A second smaller generally rectangularly-shaped opening 70 is provided in cover member 40 generally in the area where the smaller and larger portions 56 and 58, respectively, of cover member 40 meet. Opening 70 is provided with guide members 72 and 74, which may be two separate components, or a unitary guide ridge provided around the opening 70 whose function it is to permit the other arm 76 to freely move within the opening 70 in a direction which is perpendicular to the surface of cover member 40.

The distal ends 78 and 80 of arms 76 and 66 respectively are provided with semi-adhesive resilient members 82 and 84. Arm 66 of extractor member 14 is provided with a retaining portion 86 which extends outwardly from arm 66 and is disposed proximate the resilient member 84 and is adapted to engage and extend beyond the portion 41 so that when extractor member 14 is permitted to extend to its fullest outwardly extending position it is retained within the opening 64 and also prevents cover member 40 from falling away from lip 41 when housing 16 is affixed to a vertical surface as shown in FIG. 2.

In operation, a box of conically-shaped filters 12 flattened, as they come from the distributor, would have its carton opened on the end that contains the apex of the flattened filters. The apex of the flattened filters is inserted into the opening occurring at edge 22 of the housing 16. The lip 42 is then placed upon the opening so that the filters 12 are completely enclosed therein. The cover 40 is placed upon opening 34 and is now in position with the extractor member 14 extending outwardly therefrom. Exerting pressure by hand proximate the apex 68 of extractor member 14 causes the retaining portion 86 to move inwardly from lip 41 therefore freeing extractor 14 and cover member 40 so that they may both move upwardly and rearwardly in the direction of arrow 88, opening as shown in FIG. 3. At the same time the pressure is placed on the arms 66 and 76 of extractor member 14 a downward pressure is exerted by the individual so that the resilient members 82 and 84 engage one surface of the filter member 12. With that continuous motion the extractor 14 and cover member 40 is pivoted about the lip portion 41 by restraining member 62, thus permitting the filter 12 to be withdrawn from the housing 16. Because of the unique shape of the opening 34 the two sides of the collapsed filter 12 separated with the resilient members 84 and 82 acquiring therebetween one surface of the collapsed filter 12 and, as the pivoting motion occurs the second portion of the filter member follows the portion entrapped by the resilient members through the opening 34, opening the filter to its useable conical shape. The fully opened conical filter 12 may then be placed into the receptacle (basket) associated with the coffee maker. The operation of removing the filter in its opened position ready for use without it being touched by the user thereof ensures sanitary protection for these filters. If it is desired that opening 64 may be completely covered an elastic resilient membrane 90 (FIG. 4) may be placed thereover.

It will be understood that various changes in details, materials, arrangement of parts and operating conditions which have been herein described and illustrated in order to explain the nature of the invention may be made by those skilled in the art within the principles and scope of the instant invention.

Hereinbefore has been disclosed a filter housing and extractor assembly suitable for use with a conically-shaped filter that is provided in a collapsed condition in a shipping carton so that the filter members may not be touched by human hands once inserted in the storge housing and removed for use in a coffee maker.

Having thus set forth the nature of the invention what is claimed is:

1. A combined filter housing and extractor comprising:
   (a) filter storage means capable of holding a plurality of conically-shaped filters collapsed into a generally pie-shaped configuration therein, said storage means including;
  (i) a hollow generally pie-shaped housing having a top surface provided with a generally pie-shaped opening,
  (ii) a bottom surface,
  (iii) side walls,
  (iv) a small end wall, and
  (v) a larger open end through which said plurality of filters may be introduced;
(b) generally pie-shaped cover means for covering said top surface opening, said cover means including;
  (i) cover retaining means disposed proximate the larger end thereof for cooperating with said housing means opening releasably retaining said cover means in said housing means opening,
  (ii) a major opening and a minor opening, and
  (iii) guide means disposed about said minor opening; and
(c) extractor means including;
  (i) a V-shaped member having a pair of arms adapted to cooperate with each other by flexing under pressure, one arm of said pair of arms being slidably received into said cover means minor opening for movement perpendicular to said cover means as determined by said guide means, the other arm of said pair of arms being inserted into said cover means major opening, said major opening permitting said other arm to flex and return parallel to said cover and towards and away from said one arm within said cover means major opening, said other arm further comprising an extactor retaining means which cooperates with said housing means opening to releasably retain the cover and extractor when said other arm is in a rest position, and,
  (ii) resilient semi-adhesive material disposed at the distal end of each of said arms.

2. A filter housing and extractor therein according to claim 1 wherein said filter storage means further includes a removable lid for covering said larger open end.

3. A filter housing and extractor according to claim 1 wherein said cover means major opening is covered by a resilient membrane.

4. A filter housing and extractor according to claim 1 wherein said extractor retaining means is disposed proximate the distal end of said other arm for releasably retaining said extractor means and said cover means within said hollow housing means opening.

5. A filter housing and extractor according to claim 4 wherein said filter storage means bottom surface further includes a mounting flange means for mounting said housing and extractor on a vertical surface.

6. A filter housing and extractor according to claim 1 wherein said top surface opening further includes an inwardly extending ledge disposed around the perimeter of said top surface opening for releasably retaining and supporting said cover.

7. A filter housing and extractor according to claim 6 wherein said filter storage means bottom surface further includes a mounting flange means for mounting said housing and extractor on a vertical surface.

* * * * *